(12) United States Patent
Chang et al.

(10) Patent No.: US 8,730,618 B2
(45) Date of Patent: May 20, 2014

(54) SYSTEM AND APPARATUS FOR VIBRATION DAMPING OF INTEGRATED LEAD SUSPENSIONS IN HIGH DENSITY MAGNETIC STORAGE DEVICES

(75) Inventors: Jen-Yuan Chang, San Jose, CA (US); Kevin Ihwa Tzou, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 327 days.

(21) Appl. No.: 12/902,738

(22) Filed: Oct. 12, 2010

(65) Prior Publication Data
US 2011/0026165 A1 Feb. 3, 2011

Related U.S. Application Data

(62) Division of application No. 11/735,744, filed on Apr. 16, 2007, now Pat. No. 7,903,376.

(51) Int. Cl.
*G11B 33/14* (2006.01)
(52) U.S. Cl.
USPC .................................. 360/245.9; 360/97.02
(58) Field of Classification Search
USPC ........ 360/97.02, 240, 264, 264.1, 264.2, 244, 360/245.8, 245.9, 246; 369/247.1, 248; 720/651, 648

See application file for complete search history.

(56) References Cited

U.S. PATENT DOCUMENTS

| | | | | |
|---|---|---|---|---|
| 5,140,482 A | * | 8/1992 | Kimura et al. | 360/264.2 |
| 5,986,853 A | * | 11/1999 | Simmons et al. | 360/245.9 |
| 6,212,043 B1 | * | 4/2001 | Nakamura et al. | 360/244.3 |
| 6,536,555 B1 | * | 3/2003 | Kelsic et al. | 181/207 |
| 6,898,051 B2 | * | 5/2005 | Bahirat et al. | 360/99.08 |
| 6,943,302 B2 | * | 9/2005 | Kageyama et al. | 174/254 |
| 2004/0264058 A1 | * | 12/2004 | Huynh | 360/264.2 |
| 2008/0226949 A1 | * | 9/2008 | Hanrahan | 428/812 |

FOREIGN PATENT DOCUMENTS

JP 10134529 A * 5/1998 ............ G11B 21/02

* cited by examiner

*Primary Examiner* — Julie Anne Watko

(57) ABSTRACT

An integrated lead suspension (ILS) has a constrained layer damper (CLD) that attenuates vibration of the ILS. The CLD may be applied over an already assembled ILS such that the CLD is applied to the cover layer, to the base layer, or to both. Alternatively, the ILS may be encapsulated via a deposition process such that a damping layer is sandwiched between the conductor layer and the cover layer of the ILS, between the conductor layer and the dielectric layer of the ILS, or both.

14 Claims, 5 Drawing Sheets

SYSTEM AND APPARATUS FOR VIBRATION DAMPING OF INTEGRATED LEAD SUSPENSIONS IN HIGH DENSITY MAGNETIC STORAGE DEVICES

This application is a divisional of U.S. patent application Ser. No. 11/735,744, filed Apr. 16, 2007, and is incorporated herein by reference in its entirety.

BACKGROUND OF THE INVENTION

1. Technical Field

The present invention relates in general to disk drives and, in particular, to an improved system and apparatus for vibration damping of integrated lead suspensions in high density magnetic storage devices.

2. Description of the Related Art

Data access and storage systems generally comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to five disks are stacked vertically on a common spindle that is turned by a disk drive motor at several thousand revolutions per minute (rpm).

A typical HDD uses an actuator assembly to move magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

A slider is typically formed with an aerodynamic pattern of protrusions on its air bearing surface (ABS) that enables the slider to fly at a constant height close to the disk during operation of the disk drive. A slider is associated with one side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

With increasing data densities, off-track motion related to integrated lead suspension (ILS) vibration has become a significant contributor to track misregistration (TMR). Airflow from the disks is the primary excitation mechanism for the ILS and the resulting ILS vibration introduces off-track to the head by deflecting the HGA. Previous solutions for minimizing ILS vibration include guide slots formed in the actuator arm and drops of adhesive that secure the ILS to the actuator arm at multiple locations.

In FIG. 1, for example, the rotary actuator 11 of a disk drive is subject to airflow-induced vibration that adversely affects performance. In a typical design, the conductive traces on the ILS tail 13 that extend from the HGA 15 are soldered to the pads 17 on a flexible cable assembly 19. In such an arrangement, airflow from the rotating disks impinges on the ILS traces and the resulting trace vibration produces an off-track motion of the head that the disk drive perceives as TMR. The orientation of the actuator within the rotating disk pack has a significant impact on how the airflow excites the ILS traces. For instance, when the head is at the OD of the disk, the airflow excitation driving ILS vibration has axial as well as radial and tangential components. However, when the head is at the ID of the disk, ILS vibration is primarily driven by in-plane airflow. As there are multiple resonant frequencies of the ILS trace and the nature of the airflow excitation changes as a function of actuator orientation, a robust solution that addresses this problem would be desirable. What is proposed in this disclosure is the addition of a constrained layer damper (CLD) on the ILS that also minimizes the extent to which the ILS will vibrate.

SUMMARY OF THE INVENTION

Embodiments of a system and apparatus for including a damping layer to integrated lead suspensions (ILS) are effective at attenuating vibration of the ILS. Prior art solutions focused primarily on reducing the level of excitation for the ILS, but do not directly attenuate vibration. In contrast, damping layers in accordance with the invention may be integrated into the ILS design (in which the damping layer is sandwiched within the ILS) or may be applied as a constrained layer damper after ILS assembly.

The present invention focuses on reducing vibration in HGA designs by attenuating vibration produced in the ILS. During both idle and seeking operations, the ILS is subjected to turbulent airflow. The subsequent displacement of the ILS produces a net variation in moment about the pivot, resulting in off-track motion of the head. Typical and common means to reduce ILS vibration are to add UV glue dots or guide slot features that constrain the ILS and/or shield the ILS from airflow. Both of these prior art solutions require additional processes in the HDD assembly, resulting in increased manufacturing time.

The ILS comprises a polyimide cover layer that protects the conductive copper traces that provide power and also transmit read/write signals. To improve signal integrity, a dielectric layer is placed between the conductors and base layer. This dielectric layer minimizes electromagnetic interaction with the base layer, which is typically stainless steel. Aside from the inherent damping capability of the polyimide layers, there is little damping in a typical ILS tail design.

In one embodiment, the present invention applies damping to the ILS tail by direct application of a constrained layer damper (CLD) over an already assembled ILS such that the CLD is applied to the cover layer, to the base layer, or to both. One advantage of direct application is that the CLD may be applied at any point after ILS assembly with minimal impact to the existing ILS manufacturing process. In another embodiment, the ILS is encapsulated via a deposition process. This design has high reliability as there is less risk of the damper delaminating from the ILS. The damping layer may be sandwiched between the conductor layer and the cover layer, or between the conductor layer and the dielectric layer, or both.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
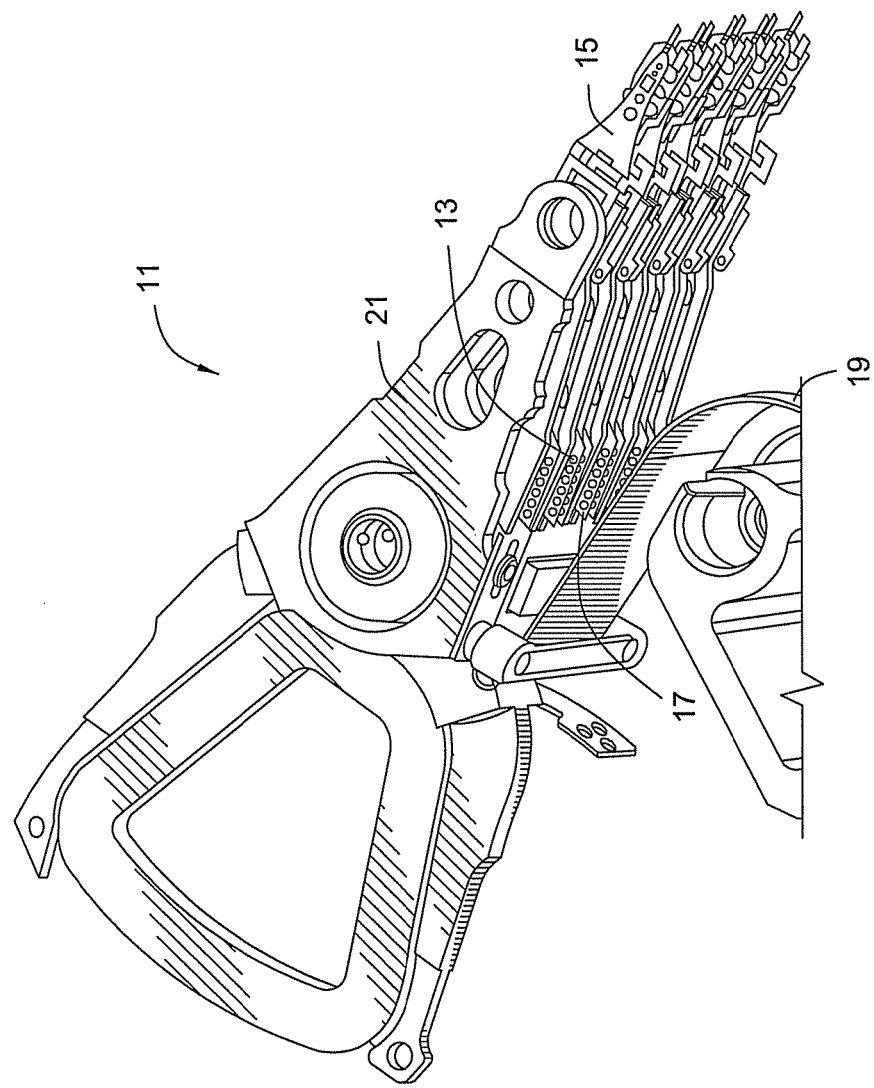
FIG. 1 is an isometric view of a conventional actuator assembly.
Figure 2:
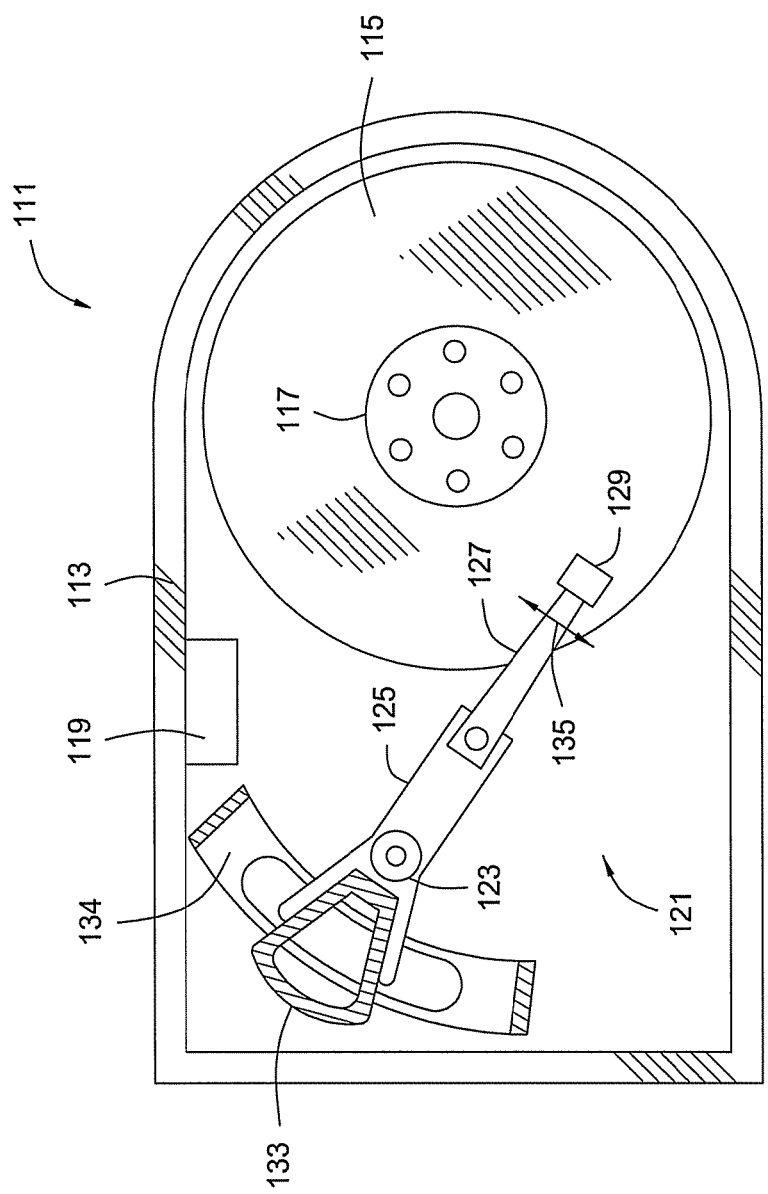
FIG. 2 is a schematic plan view of a disk drive constructed in accordance with the invention.
Figure 3:
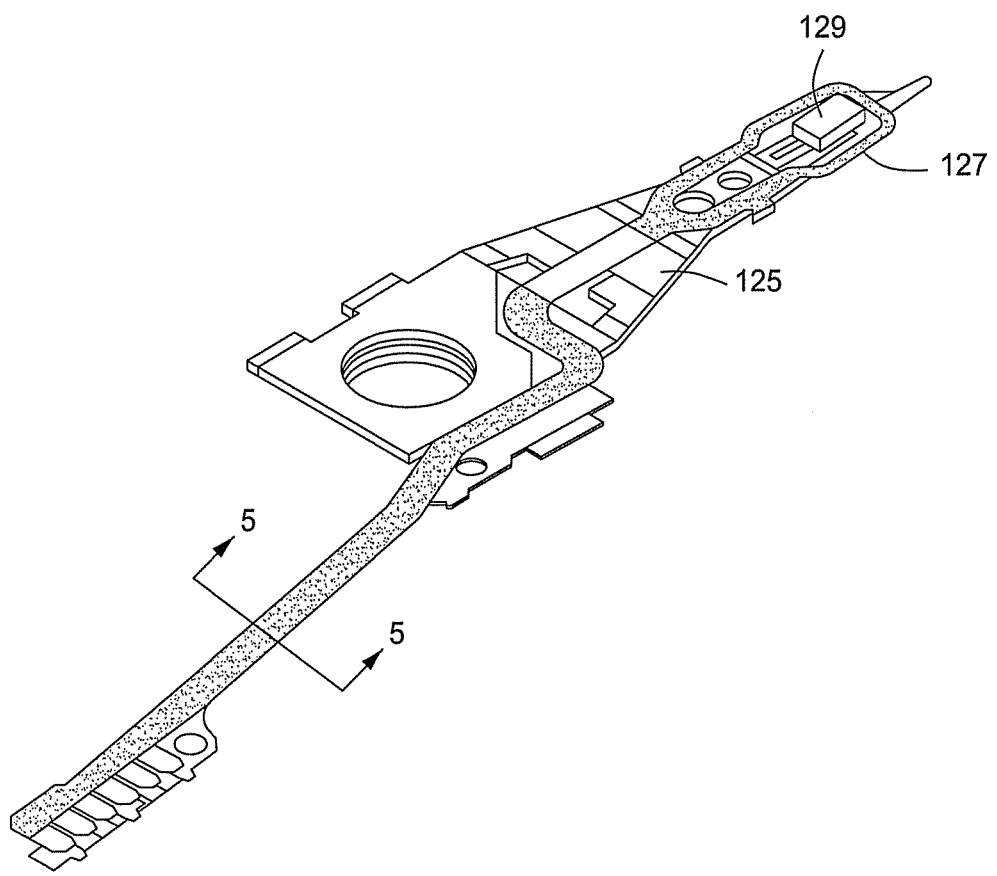
FIG. 3 is an isometric view of an ILS constructed in accordance with the invention.

Referring to FIG. 2, a schematic drawing of one embodiment of an information storage system comprising a magnetic hard disk file or drive 111 for a computer system is shown. Drive 111 has an outer housing or base 113 containing at least one magnetic disk 115. Disk 115 is rotated by a spindle motor assembly having a central drive hub 117. An actuator 121 comprises a plurality of parallel actuator arms 125 (one shown) in the form of a comb that is pivotally mounted to base 113 about a pivot assembly 123. A controller 119 also is mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127. The slider 129 is usually bonded to the end of suspension 127. The head may be pre-loaded against the surface of disk 115 by suspension 127.

Suspensions 127 have a spring-like quality which biases or urges the air bearing surface of the slider 129 toward the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Figure 4:
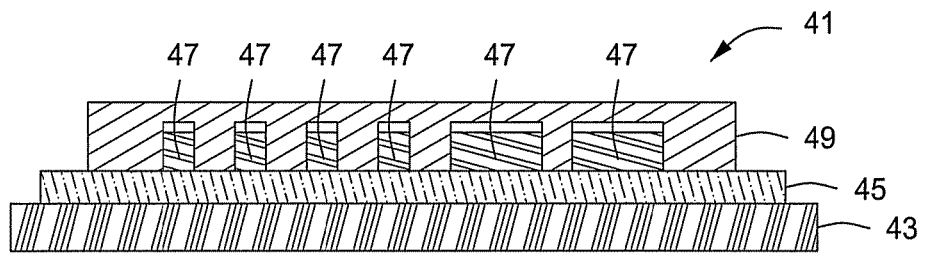
FIG. 4 is a sectional end view of a conventional ILS tail.

FIG. 4 depicts a sectional view of a conventional ILS tail 41 comprising a base layer 43 for structural support, a dielectric layer 45 formed on base layer 43 for insulation and to improve signal integrity and minimize electromagnetic interaction with the base layer 43. In addition, a plurality of conductors 47 are formed on dielectric layer 45 for providing power and transmitting read/write signals, and a cover layer 49 is formed over the conductors 47 on the dielectric layer 45. Base layer 32 may be formed from stainless steel, dielectric and cover layers 45, 49 may be formed from polyimide, and the conductors 47 may be formed from a copper alloy.

Referring now to FIGS. 3 and 5-8, various embodiments of a system and apparatus for vibration damping of integrated lead suspensions in high density magnetic storage devices are shown. As will be described in greater detail below, each embodiment comprises a constrained layer damper (CLD) comprising a layer of damping material and a constraining layer.

Figure 5:
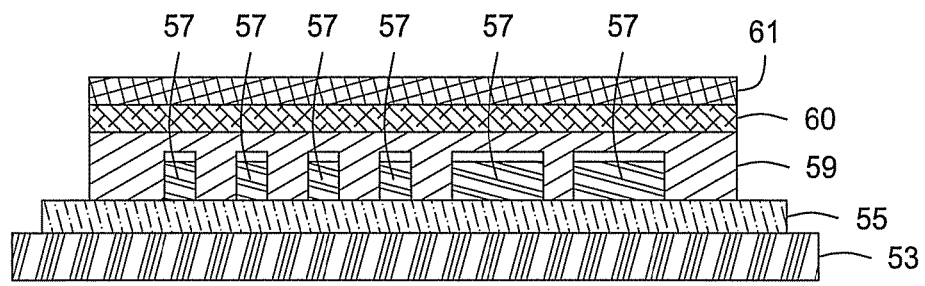
FIG. 5 is a sectional end view of one embodiment of an ILS tail taken along the line 5-5 of FIG. 3 and is constructed in accordance with the invention.
Figure 6:
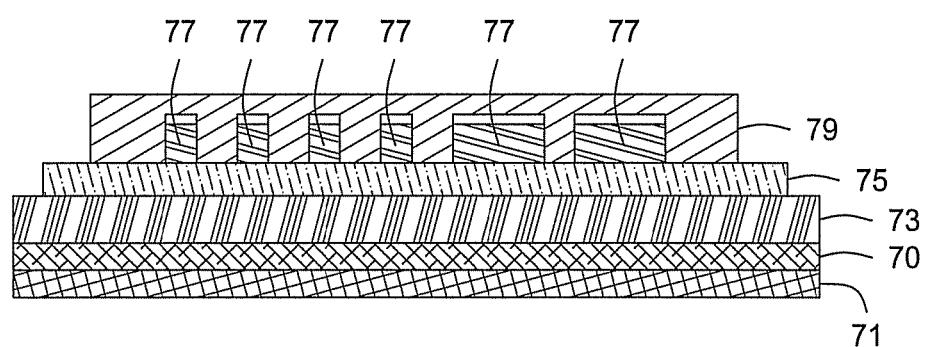
FIG. 6 is a sectional end view of another embodiment of an ILS tail constructed in accordance with the invention.

In the two embodiments of FIGS. 5 and 6, the CLD is applied directly to an already assembled ILS (e.g., FIG. 4). One advantage of these direct application embodiments is the CLD can be applied at any point after ILS assembly with minimal impact to the existing ILS manufacturing process. The CLD may be applied to the cover layer, the base layer, or both of these two layers. For example, FIG. 5 shows a dielectric layer 55 between a base layer 53 and conductors 57, with the conductors 57 between a cover layer 59 and the dielectric layer 55. A layer of damping material 60 is applied to the cover layer 55 opposite the conductors 57. A layer of constraining material 61 is applied to or formed on the damping layer 60 to constrain the damping layer 60.

Alternatively and as shown in FIG. 6, the damping layer 70 may be formed directly on base layer 73, with a constraining layer 71 on the damping layer 70. The width of the CLD may be equal to that of the underlying layer to which it is attached. For example, in FIG. 5, the damping and constraining layers 60, 61 have a width (left to right) that is substantially equal to the width of underlying cover layer 59. However, in FIG. 6, the damping and constraining layers 70, 71 have a width that is substantially equal to the width of underlying base layer 73. Thus, the lateral side edges of the damping layers 60, 70 are exposed along the sides of the ILS.

Figure 7:
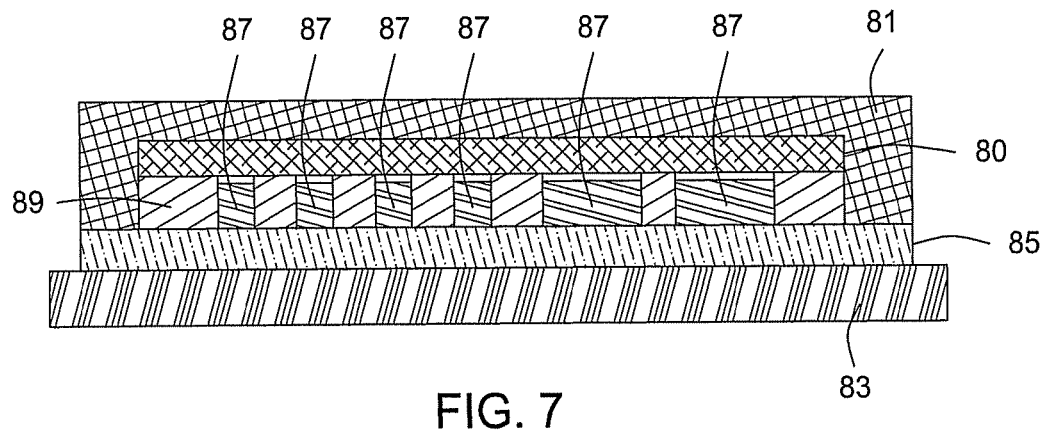
FIG. 7 is a sectional end view of still another embodiment of an ILS tail constructed in accordance with the invention.
Figure 8:
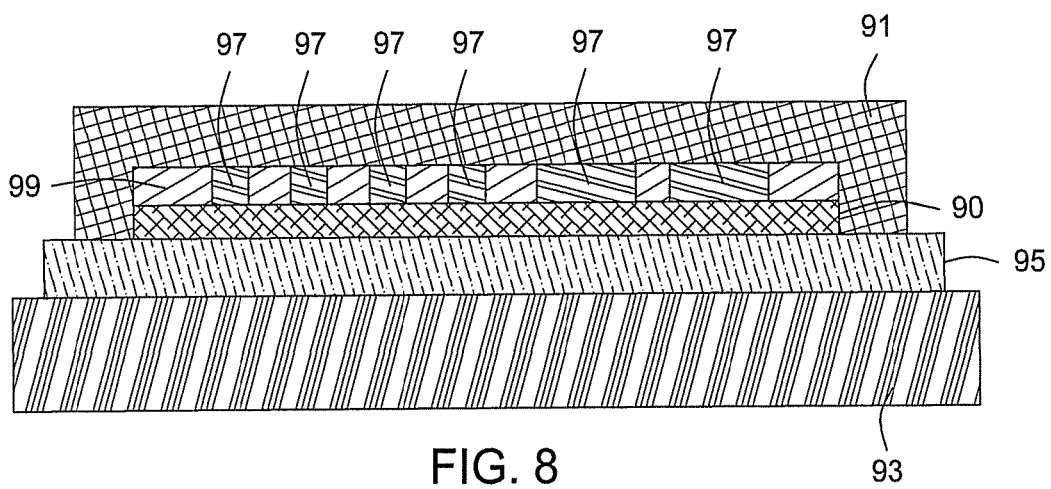
FIG. 8 is a sectional end view of yet another embodiment of an ILS tail constructed in accordance with the invention.

The two embodiments of FIGS. 7 and 8 depict CLDs that encapsulate the underlying conductors and cover layer. This version adds a deposition process in, for example, a supplier's manufacturing line to assemble the design. However, this design has the benefit of higher reliability as there is less risk of the damper delaminating from the ILS.

For example, in FIG. 7 the damping layer 80 is formed on the cover layer 89 in a geometry similar to that shown in FIG. 5. The width of damping layer 80 is substantially equal to the width of cover layer 89 as it extends over the conductors 87. However, constraining layer 81 extends laterally beyond the width of damping layer 80 and cover layer 89 and down to the dielectric layer 85, which resides on base layer 83. The constraining layer 81 may be provided with a lateral width equal to that of dielectric layer 85 as shown.

Alternatively and as shown in FIG. 8, the damping layer 90 may be positioned between the dielectric layer 95 and the conductors 97 and/or cover layer 99. In this embodiment, the damping layer 90 also is substantially equal to the width of cover layer 99 about conductors 97, and the constraining layer 91 extends laterally beyond the width of damping layer 90 and cover layer 99 and down to the dielectric layer 95 residing on base layer 93. The constraining layer 91 may be provided with a lateral width that is less than that of dielectric layer 95 as shown.

While the invention has been shown or described in only some of its forms, it should be apparent to those skilled in the art that it is not so limited, but is susceptible to various changes without departing from the scope of the invention.

What is claimed is:

1. An integrated lead suspension, comprising:
   a base layer extending in a longitudinal direction that defines a lateral direction that is transverse to the longitudinal direction;
   a dielectric layer formed on base layer;
   a plurality of conductors formed on the dielectric layer opposite the base layer;
   a cover layer formed over the conductors on the dielectric layer; and
   a damping layer secured to and extending along the cover layer.

2. An integrated lead suspension according to claim 1, wherein the damping layer comprises a constrained layer damper (CLD) having a layer of damping material and a constraining layer for constraining the damping material.

3. An integrated lead suspension according to claim 1, wherein the base layer is formed from stainless steel, the dielectric and cover layers are formed from polyimide, and the conductors are formed from a copper alloy.

4. An integrated lead suspension according to claim 1, wherein the damping layer has a lateral width extending in the lateral direction that is substantially equal to a lateral width of a layer to which the damping layer is attached, such that lateral side edges of the damping layer are exposed along lateral sides of the integrated lead suspension.

5. An integrated lead suspension according to claim 1, wherein the damping layer comprises a constrained layer damper (CLD) having a layer of damping material and a constraining layer for constraining the damping material, and the constraining layer and the damping material have widths that are substantially equal in the lateral direction.

6. An integrated lead suspension according to claim 1, wherein the damping layer and the cover layer have widths that are substantially equal in the lateral direction, and the widths are less than a width of the base layer.

7. A disk drive, comprising:
   an enclosure;
   a disk rotatably mounted to the enclosure and having magnetic media;
   an actuator pivotally mounted to the enclosure and having an arm extending in a longitudinal direction and defining a lateral direction that is transverse to the longitudinal direction;
   a flexible cable secured to the actuator;
   a suspension mounted to the arm and having a transducer for reading data from the magnetic media;
   a flexure extending from the transducer to the arm, the flexure having a tail that extends from the arm and is coupled to the flexible cable, the tail comprising a base layer for structural support, a dielectric layer formed on base layer for insulation and to improve signal integrity and minimize electromagnetic interaction with the base layer, a plurality of conductors formed on the dielectric layer for providing power and transmitting signals to the transducer, a cover layer formed over the conductors on the dielectric layer; and
   a damping layer secured to and extending along the cover layer for attenuating vibration of the suspension, the damping layer comprising a constrained layer damper (CLD) having a layer of damping material and a constraining layer for constraining the damping material.

8. A disk drive according to claim 7, wherein the base layer is formed from stainless steel, the dielectric and cover layers are formed from polyimide, and the conductors are formed from a copper alloy.

9. A disk drive according to claim 7, wherein the damping layer has a lateral width extending in the lateral direction that is substantially equal to a lateral width of the cover layer, such that lateral side edges of the damping layer are exposed along lateral sides of the suspension.

10. A disk drive according to claim 7, wherein the constraining layer and the damping material have widths that are substantially equal in the lateral direction.

11. A disk drive according to claim 7, wherein the damping layer and the cover layer have widths that are substantially equal in the lateral direction, and the widths are less than a width of the base layer and the dielectric layer.

12. A disk drive, comprising:
    an enclosure;
    a disk rotatably mounted to the enclosure and having magnetic media;
    an actuator pivotally mounted to the enclosure and having an arm extending in a longitudinal direction and defining a lateral direction that is transverse to the longitudinal direction;
    a flexible cable secured to the actuator;
    a suspension mounted to the arm and having a transducer for reading data from the magnetic media;
    a flexure extending from the transducer to the arm, the flexure having a tail that extends from the arm and is coupled to the flexible cable, the tail comprising a base layer for structural support, a dielectric layer formed on base layer for insulation and to improve signal integrity and minimize electromagnetic interaction with the base layer, a plurality of conductors formed on the dielectric layer for providing power and transmitting signals to the transducer, a cover layer formed over the conductors on the dielectric layer;
    a constrained layer damper (CLD) secured to and extending along the cover layer for attenuating vibration of the suspension, the CLD having a layer of damping material and a constraining layer for constraining the damping material; and
    the CLD and the cover layer have widths that are substantially equal in the lateral direction, and the widths are less than a width of the base layer and the dielectric layer.

13. A disk drive according to claim 12, wherein the base layer is formed from stainless steel, the dielectric and cover layers are formed from polyimide, and the conductors are formed from a copper alloy.

14. A disk drive according to claim 12, wherein the constraining layer and the damping material have widths that are substantially equal in the lateral direction.

* * * * *